United States Patent Office 3,798,195
Patented Mar. 19, 1974

3,798,195
THERMOSTABLE POLYMERIC VINYLIDENE CHLORIDE COMPOSITIONS
Richard E. Watson, Midland, Mich., assignor to The Dow Chemical Company, Midland, Mich.
No Drawing. Continuation of abandoned application Ser. No. 169,356, Aug. 5, 1971. This application Apr. 26, 1973, Ser. No. 354,593
Int. Cl. C09d 3/74
U.S. Cl. 260—30.4 R     5 Claims

ABSTRACT OF THE DISCLOSURE

This invention is directed to compositions of matter comprising a polymer of vinylidene chloride and as a heat stabilizing agent therefor, from about 0.25 to 2 percent by weight of N,N-bis (2-hydroxyethyl) glycine sodium salt.

CROSS-REFERENCE TO RELATED APPLICATION

This is a continuation of application Ser. No. 169,356, filed Aug. 5, 1971, now abandoned.

BACKGROUND OF THE INVENTION

The polymers of vinylidene chloride have been described in patents and in other literature for many years, e.g. U.S. Pat. 2,558,728, issued July 3, 1951. Such polymeric bodies, and compositions containing them are herein referred to as polymeric vinylidene chloride products. It has been found that most such products tend to darken after prolonged exposure to elevated temperatures. This darkening is accompanied by a change in the other physical properties of the polymeric product and is assumed to be an evidence of partial decomposition. Because of the many desirable properties of polymeric vinylidene chloride products, it is among the objects of the present invention to overcome or to prevent the tendency of such products to darken on heating.

SUMMARY

It has been discovered, which discovery forms the present invention, that the foregoing and related objects may be attained through the incorporation in polymeric vinylidene chloride products of small amounts, generally in the range of from about 0.25 to 2 percent by weight, of N,N-bis (2-hydroxyethyl) glycine sodium salt. This compound has been found useful in polymeric vinylidene chloride products per se or in the form of lacquers of vinylidene chloride polymers whether or not such modifiers as plasticizers, light stabilizers, or coloring agents are also present.

DESCRIPTION OF THE PREFERRED EMBODIMENTS

By way of example, a copolymer of about 92.5 percent vinylidene chloride, 5 percent acrylonitrile and 2.5 percent methyl methacrylate was intimately mixed with from about 1 percent by weight N,N-bis (2-hydroxyethyl) glycine. The admixture was then dissolved in a solvent mixture composed of 60 parts by weight tetrahydrofuran and 40 parts by weight toluene in an amount sufficient to form a solution containing 15 percent by weight of copolymer. The solution was initially substantially colorless and remained so even after being aged for five (5) days at a temperature of 45° C. in the presence of a chrome coupon. Additionally, there was no observable corrosion imparted to the chrome coupon during such aging.

By way of comparison, an otherwise identical solution but wherein the N,N-bis (2-hydroxyethyl) glycine was not present, became noticeably dark brown in color during the designated aging period, and significant corrosion was imparted to the chrome coupon.

Other tests have indicated that the amount of N,N-bis (2-hydroxyethyl) glycine may be as little as 0.25 percent, especially when the thermal conditions to be encountered by the composition are not extreme. In no case has it been found advantageous or desirable to employ more than 2 percent of this compound for its stabilizing effect. It has further been found that the stabilizing agent may be added to a solvent solution of a vinylidene chloride polymer.

What is claimed is:
1. A lacquer of a vinylidene chloride polymer stabilized against thermal degradation having in admixture therewith as the stabilizer from about 0.25 to 2 percent by weight of N,N-bis (2-hydroxyethyl) glycine, sodium salt.
2. The composition of claim 1 wherein said lacquer comprises a vinylidene chloride polymer dissolved in a mixture of tetrahydrofuran and toluene.
3. The composition of claim 2 wherein said mixture comprises about 60 parts by weight tetrahydrofuran and about 40 parts by weight of toluene.
4. The comopsition of claim 3 wherein said vinylidene chloride polymer is a copolymer of vinylidene chloride, acrylonitrile and methyl methacrylate.
5. The composition of claim 4 wherein said copolymer contains about 92.5 percent vinylidene chloride, about 5 percent acrylonitrile and about 2.5 percent methyl methacrylate.

References Cited
UNITED STATES PATENTS

| | | | |
|---|---|---|---|
| 2,224,944 | 12/1940 | Young | 260—30.4 |
| 2,789,101 | 4/1957 | Wilson | 260—45.75 |
| 2,558,728 | 7/1951 | Britton et al. | 260—45.85 |
| 3,335,108 | 8/1967 | Pines | 260—45.85 |
| 3,335,109 | 8/1967 | Pines | 260—45.85 |
| 2,990,391 | 6/1961 | Grantham | 260—30.4 |
| 2,941,974 | 6/1960 | Reymann et al. | 260—30.4 |

FOREIGN PATENTS 623,971   7/1961   Canada.

HOSEA E. TAYLOR, Primary Examiner
V. P. HOKE, Assistant Examiner

U.S. Cl. X.R.
260—33.6 UA, 45.85 A